No. 827,297. PATENTED JULY 31, 1906.
T. A. EDISON.
ALKALINE BATTERY.
APPLICATION FILED JULY 21, 1904.
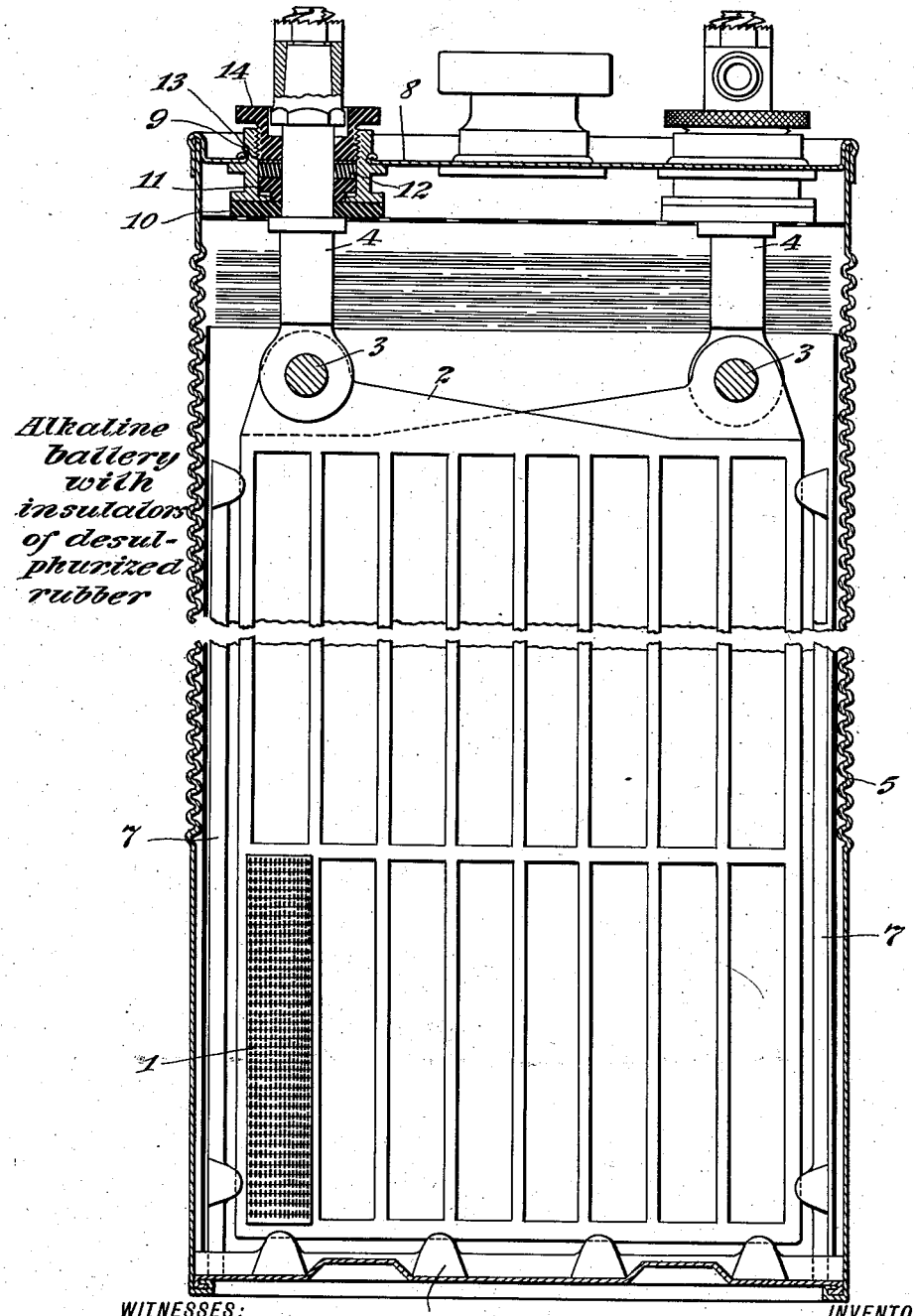
Alkaline battery with insulators of desulphurized rubber
WITNESSES:
Frank D. Lewis
Delos Holden
INVENTOR
Thomas A. Edison
BY
Frank L. Dyer
ATTORNEY.

UNITED STATES PATENT OFFICE.

THOMAS A. EDISON, OF LLEWELLYN PARK, NEW JERSEY, ASSIGNOR TO EDISON STORAGE BATTERY COMPANY, OF WEST ORANGE, NEW JERSEY, A CORPORATION OF NEW JERSEY.

ALKALINE BATTERY.

No. 827,297.     Specification of Letters Patent.     Patented July 31, 1906.

Application filed July 21, 1904. Serial No. 217,539.

*To all whom it may concern:*

Be it known that I, THOMAS A. EDISON, a citizen of the United States, residing at Llewellyn Park, Orange, Essex county, New Jersey, have invented a certain new and useful Improvement in Alkaline Batteries, of which the following is a description.

In experimenting with my improved iron-nickel battery, using an alkaline solution, it was discovered that active sulfids were present, thereby lessening the efficiency of the battery and detracting from its desirability as a source of power for use with automobiles, in which art the greatest amount of energy should be represented by the minimum weight. In seeking the cause of the formation of these active sulfids I discovered that their origin was due to the presence of free sulfur in the rubber insulators or supports (both hard and soft) used in the make-up of the battery mechanically—such, for example, as the separators between the electrode-plates, the supports for the electrode-plates, and the stuffing-boxes through which the electrodes pass. Obviously any sulfur present may be attributed to the vulcanizing process.

My present invention relates to the employment of vulcanized-rubber insulators or supports, whether hard or soft, in alkaline solutions, wherein all free sulfur capable of going into solution is eliminated, so that the material can be used in primary or secondary batteries without the formation of active sulfids in the presence of electrolysis.

To this end the invention consists in the employment in an alkaline battery of soft or hard rubber which has been previously subjected to a special process by which the objectionable sulfur will be eliminated, preferably by treating the rubber for about forty-eight hours in a solution of boiling caustic soda or potash having a density of 35° Baumé. I find that this treatment results in the elimination of so much sulfur from the rubber that no trace of sulfur can be set free in a cold caustic solution, even when immersed therein for many months, so that for the purpose of this art rubber so treated becomes perfectly stable and has no deleterious effects whatever on any of the materials used.

Reference is hereby made to the accompanying drawings, which shows in sectional elevation a storage battery embodying my invention; but I do not consider my invention limited to this or any particular type of cell, as it may be employed in any alkaline battery. The battery shown is of the Edison type, in which the active materials, containing, respectively, iron and nickel, are held in perforated pockets 1, which are carried by supporting-plates 2, plates of like polarity being connected together by bolts 3 3, upon which are sleeved conductors 4 4, respectively. The sets of plates thus bound together are placed in a suitable receptacle 5, preferably of metal, such as nickel-plated steel or iron, their lower edges resting upon supporting-insulators 6, which are slotted to receive the lower edges of the plates. The vertical edges of the plates are received in a similar manner by the vertical insulators 7 7. The vertical conductors 4 extend upward through the top or cover 8 of the receptacle through a threaded bushing 9, insulating-rings 10, 11, 12, and 13 and nut 14 being inserted, as illustrated, and forming a waterproof stuffing-box to prevent the escape of the electrolyte through said opening. The electrolyte used is an alkaline solution, such as a solution of caustic soda or potash. Separators of any suitable form will be inserted between adjacent plates 2. These separators, (not shown,) together with the insulating-supports 6 and 7, are made of hard rubber which has been treated in the manner described for the removal of sulfur therefrom. The insulating-rings 10, 11, and 13 and nut 14 may be of hard rubber and the packing-ring 12 of soft rubber treated in the manner described.

Having now described my invention, what I claim as new therein, and desire to secure by Letters Patent, is as follows:

In a battery, the combination with the electrodes, and an alkaline electrolyte, of an insulator or support exposed to the action of the electrolyte, said insulator being composed of rubber substantially free of active or uncombined sulfur, whereby the formation of sulfids is avoided, substantially as set forth.

This specification signed and witnessed this 12th day of July, 1904.

THOS. A. EDISON.

Witnesses:
   FRANK L. DYER,
   ANNA R. KLEHM.

Correction in Letters Patent No. 827,297.

It is hereby certified that in Letters Patent No. 827,297, granted July 31, 1906, upon the application of Thomas A. Edison, of Llewellyn Park, New Jersey, for an improvement in "Alkaline Batteries," an error appears in the printed specification requiring correction, as follows: In line 97 the word "nsulator" should read *insulator;* and that the said Letters Patent should be read with this correction therein that the same may conform to the record of the case in the Patent Office.

Signed and sealed this 11th day of September, A. D., 1906.

[SEAL.]

E. B. MOORE,
*Acting Commissioner of Patents.*